United States Patent [19]

Foley, Jr.

[11] 4,073,303
[45] Feb. 14, 1978

[54] OIL FIELD PIG LAUNCHER AND RECEIVER

[76] Inventor: Lawrence E. Foley, Jr., P.O. Box 935, Jennings, La. 70546

[21] Appl. No.: 727,604

[22] Filed: Sept. 28, 1976

[51] Int. Cl.² .............................................. B08B 9/04
[52] U.S. Cl. ..................................... 137/15; 137/268; 15/104.06 A
[58] Field of Search ................................. 137/268, 15; 15/104.06 A, 3.5, 3.51; 251/345, 145

[56] References Cited

U.S. PATENT DOCUMENTS

| | | | |
|---|---|---|---|
| 3,039,463 | 6/1962 | Dickey | 251/145 X |
| 3,135,293 | 6/1964 | Hulsey | 251/345 X |
| 3,177,513 | 4/1965 | Ellett | 15/104.06 A |
| 3,759,284 | 9/1973 | Crowley | 137/268 |
| 3,983,594 | 10/1976 | Simmelli | 137/268 X |

*Primary Examiner*—Alan Cohan
*Attorney, Agent, or Firm*—Clarence A. O'Brien; Harvey B. Jacobson

[57] ABSTRACT

A pig valve for use with a pigging system of a pipeline has a body insertable into the pipeline and provided with a hollow interior which forms a straight passage through the body. Rotatably disposed surrounding the body is a sleeve having associated therewith an access arrangement for permitting a pig to be transferred between the passage and outside of the passage for launching and receiving the pig. Whether the valve is used as a launcher or receiver depends only on the orientation of the valve relative to the associated pipeline, and on provision of a deflecting grate in the valve employed as a receiver. The sleeve is arranged for rotating about the longitudinal axis of the straight flow passage of the valve body so as not to interfere with fluid flow through the pipeline.

12 Claims, 10 Drawing Figures

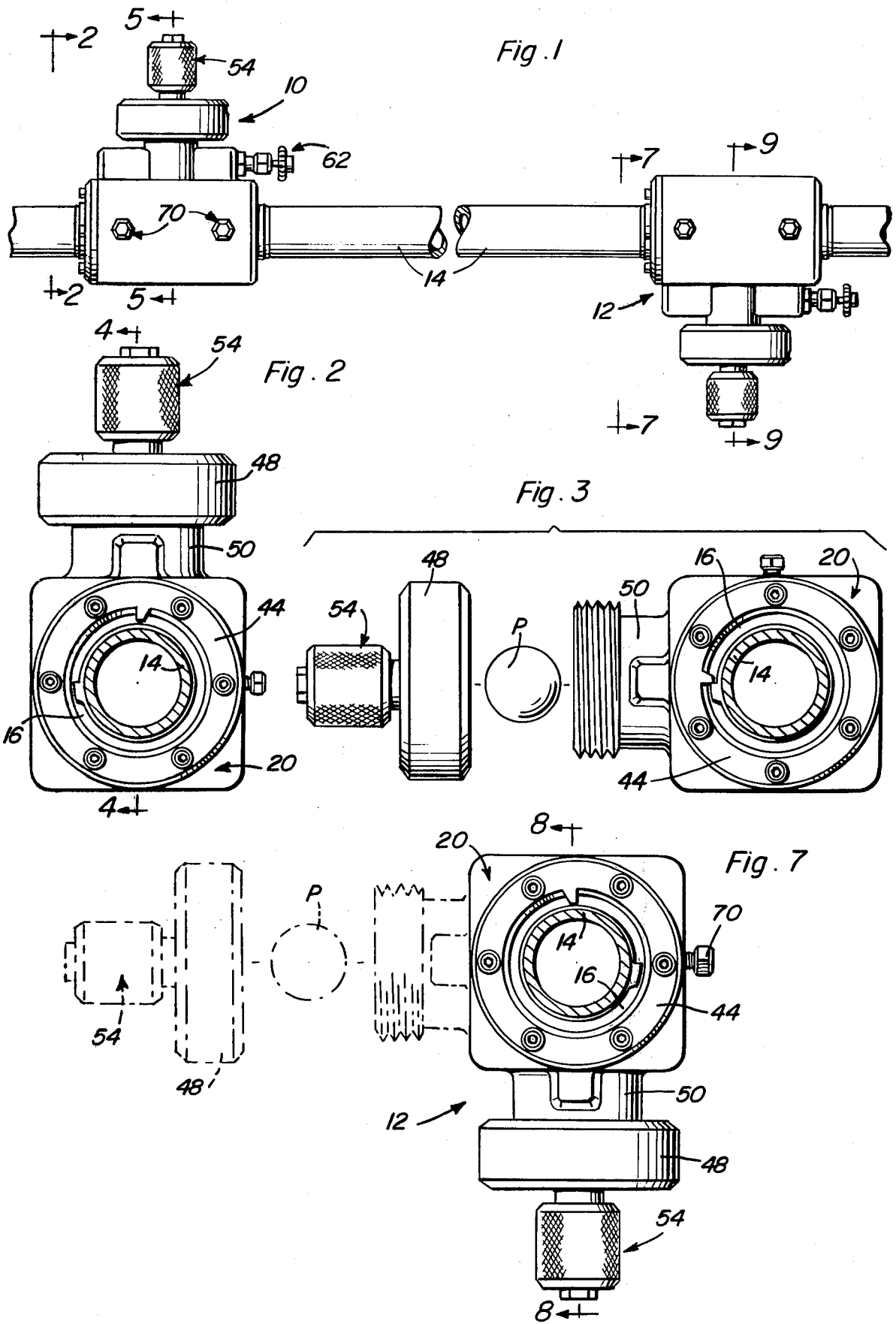

OIL FIELD PIG LAUNCHER AND RECEIVER

BACKGROUND OF THE INVENTION

1. Field of the Invention

This invention relates generally to valves used in the petroleum industry, and the like, and particularly to a pig valve for use with a pigging system of a pipeline in order to permit launching and receiving of a sphere or cylinder sent through the pipeline for the purpose of cleaning the interior surfaces of the pipe forming the line.

2. Description of the Prior Art

Petroleum products flowing through pipelines deposit substances on the walls or on the bottom of the pipe. Oil from the well deposits paraffin, which reduces the flow area and efficiency of the pipeline. Further, water and other liquids settle in low points of natural gas pipelines, forming similar obstructions to the flow of fluid through the line. Thus, it is common practice to insert a rubber "pig", which may be either a ball or cylinder, into the pipelines so that it can be pushed along by the fluid flow through the pipeline and will push ahead of it any foreign material which may obstruct flow through the line. The foreign material can be removed at the end of the line.

U.S. Pat. Nos. 3,125,116, issued Mar. 17, 1964 to B. P. Schaberg; 3,186,014, issued June 1, 1965 to H. Allen; 3,218,660, issued Nov. 23, 1965 to H. N. Eagleton; 3,246,355, issued Apr. 19, 1966 to D. A. VanScoy; and 3,473,550, issued Oct. 21, 1969 to D. A. VanScoy et al., disclose various devices for launching and receiving pigs in pipelines. Further, U.S. Pat. No. 3,035,640, issued May 22, 1962 to W. C. Gibson et al., discloses a Kelly cock for use in ball into a string of well pipe.

In general, the prior art pig valves require valve elements disposed transverse to the flow of fluid through the pipeline so as to at least partially block the fluid flow during pig launching and receiving operations. Further, the flow through the valve, or through accessory piping necessary for installation of the valve, often requires inefficient and expensive sharp turns in the flow path.

SUMMARY OF THE INVENTION

It is an object of the present invention to provide a pig valve which allows the insertion of a pig into and the retraction from a pressurized flowing pipeline without significantly interrupting the flow through the pipeline.

It is an object of the present invention to provide a pig valve which minimizes interruption of flow through a pipeline, yet is of simple, reliable, and economical construction.

It is still another object of the present invention to provide a pig valve which minimizes pollution from bleed-off, with only a small volume of fluid which can be piped into a suitable container being bled from the valve before opening same.

It is yet another object of the present invention to provide a pig valve which achieves reduced turbulence of flow through the valve.

It is a still further object of the present invention to provide a pig valve which can be installed directly into a pipeline without requiring accessory piping, and the like.

These and other objects are achieved according to the present invention by providing a valve having: a body forming a straight-through passage and insertable into a pipeline, with the passage providing part of a fluid flow path through the pipeline; a sleeve rotatably disposed surrounding the body; and an access arrangement associated with the sleeve for permitting a pig to be transferred between the passage provided in the body and a point outside of the pipeline and valve. Preferably, the body is substantially a hollow cylinder in shape, with the sleeve having a through hole substantially circular in cross section and arranged receiving the cylindrical body for rotating coaxially of and about the body. By coaxially is meant about the longitudinal axes of the flow passage provided through the body, or about an axis parallel to flow through the pipeline.

The access arrangement advantageously includes an opening provided in a cylindrical wall of the body, with the sleeve having an enlarged portion and the access arrangement further including a chamber formed in the enlarged portion of the sleeve and disposed for communicating with the opening provided in the body in a one radial position of the sleeve relative to the longitudinal axes of the passage provided in the body. An insert is disposed in a recess formed in a portion of the body for itself forming a seal for the chamber when the sleeve is rotated substantially 90° from the one axial position and the chamber is disposed opposite the insert. This insert can be constructed as a segment of a circle from a metal or other suitable material, and is covered on the curved outer surface thereof with a suitable resilient material, such as a natural or synthetic rubber.

The access arrangement advantageously further includes a cap removably mounted on the enlarged portion of the sleeve for covering the chamber, and with pressure bleeding and equalizing valves provided in the cap and sleeve, respectively, for sequentially placing the chamber in communication with the ambient pressure when the chamber is opposite the insert, and for placing the chamber in communication with the pressure in the body passage before rotating the sleeve from its loading position wherein the chamber is opposite the insert and bringing the chamber into its transfer position opposite the opening provided in the body. When a valve according to the invention is employed as a pig receiver, a deflector grate is disposed in the passage provided in the body downstream along the fluid flow path through the body of the opening also provided in the body for diverting the pig through the opening and into the chamber. The opening and chamber are disposed beneath, or under, the body when the valve is employed for receiving a pig so as to use the force of gravity to facilitate the diversion of the pig into the chamber. Conversely, when the valve is used as a launcher, the opening provided in the body of the valve is disposed upwardly so that the force of gravity can be employed to facilitate transfer of a pig from the chamber of the sleeve through the opening and into the passage of the body.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic, side elevational view showing a pigging system for a pipeline which employs valves according to the present invention.

FIG. 2 is an enlarged, sectional view taken generally along the line 2—2 of FIG. 1.

FIG. 3 is an exploded, sectional view similar to FIG. 2, but with the valve rotated 90° degrees to the left from the orientation shown in FIG. 2.

FIG. 7 is an enlarged, sectional view taken generally along the line 7—7 of FIG. 1.

DESCRIPTION OF THE PREFERRED EMBODIMENTS

Figure 4:
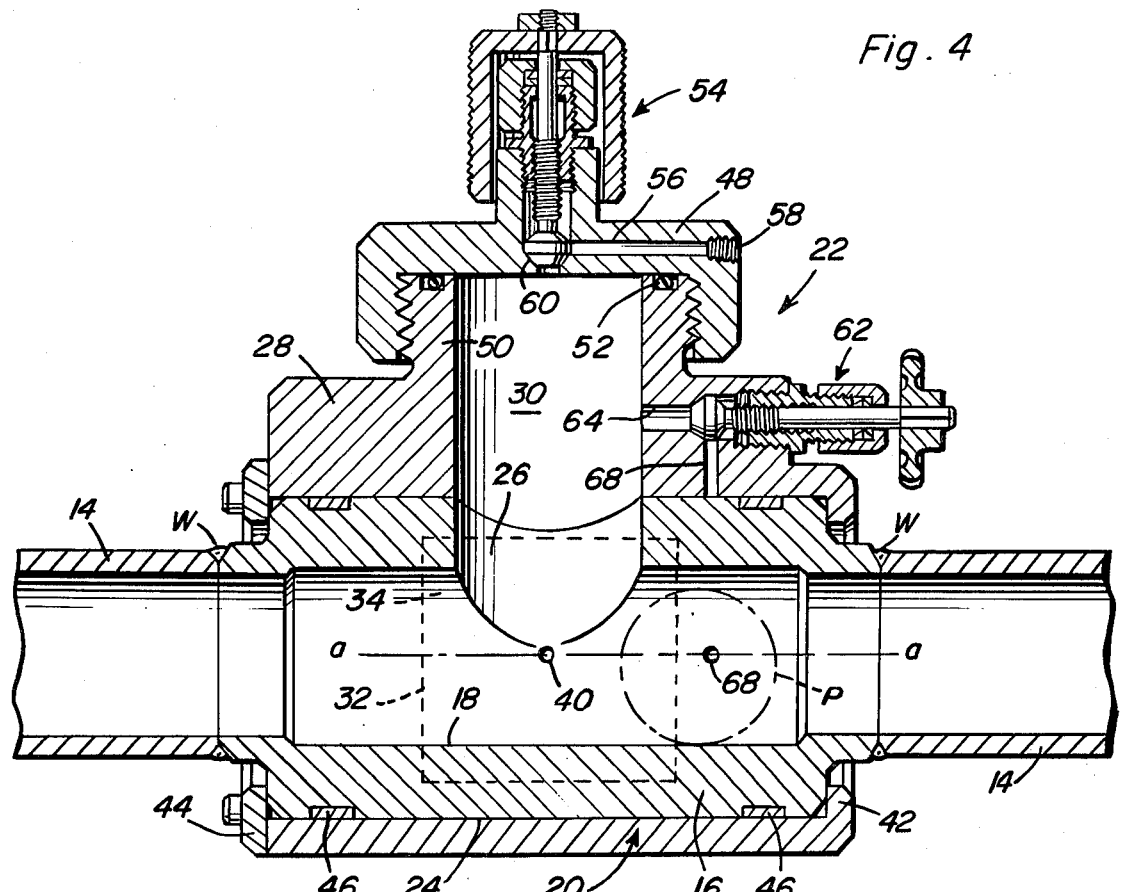
FIG. 4 is an enlarged, fragmentary, sectional view taken generally along the line 4—4 of FIG. 1.

Referring now more particularly to FIG. 1 of the drawings, pig valves 10 and 12 according to the present invention are shown as inserted into a pipeline 14 to form a launcher and receiver, respectively, for a pigging system of pipeline 14.

Description of the Launcher Valve

As can be seen from FIGS. 2 through 6 of the drawings, the launcher valve 10 includes a body 16 provided with a straight-through passage 18, which may be of slightly larger diameter than pipeline 14, inserted into pipeline 14 at a predetermined launching point for a pig P. The body 16 may be secured to sections of pipeline 14 in a conventional manner, such as by welding at the points designated W in FIG. 4. In this manner, passage 18 forms part of a fluid flow path through pipeline 14. A sleeve 20 is rotatably disposed surrounding body 16, and includes an insertion arrangement 22 for permitting a pig P to be inserted into passage 18 for travel through pipeline 14 in order to remove paraffin and other foreign material from the interior of the pipeline.

Body 16 is substantially a hollow cylinder in shape, with the sleeve 20 having a through hole 24 substantially circular in cross section and arranged receiving body 16 in mating fashion for permitting sleeve 20 to rotate coaxially with the axis a—a (FIG. 4) of body 16 and passage 18. That is, axis a—a is disposed at the center of revolution of the cylindrical surface of body 16 and sleeve 20, or otherwise stated, is parallel to the direction of flow of fluid through the pipeline 14 and passage 18.

Insertion arrangement 22 includes an opening 26 provided in body 16 and oriented directly upwardly with respect to pipeline 14 and body 16. Further, sleeve 20 is provided with an enlarged portion 28 in which is formed a chamber 30 disposed for communicating with opening 26 in a one axial position of sleeve 20 relative to body 16. This one position is that shown in FIGS. 4 and 5.

Figure 5:
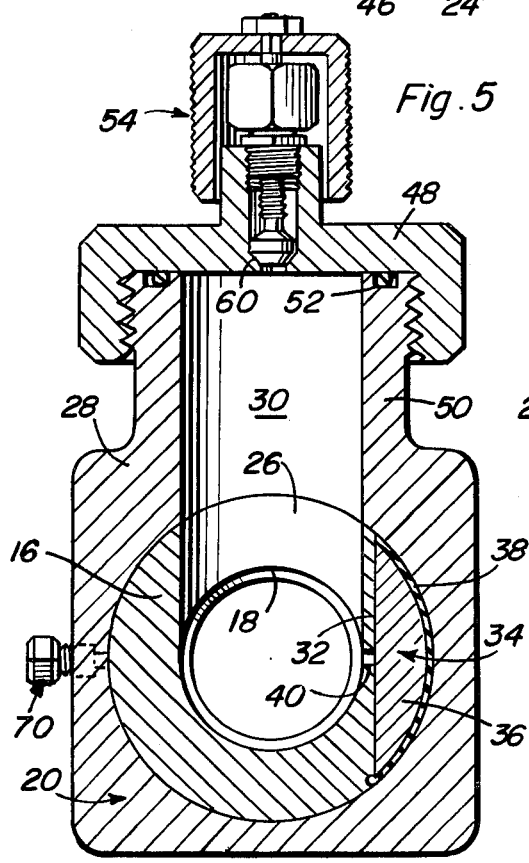
FIG. 5 is an enlarged, sectional view taken generally along the line 5—5 of FIG. 1.
Figure 6:
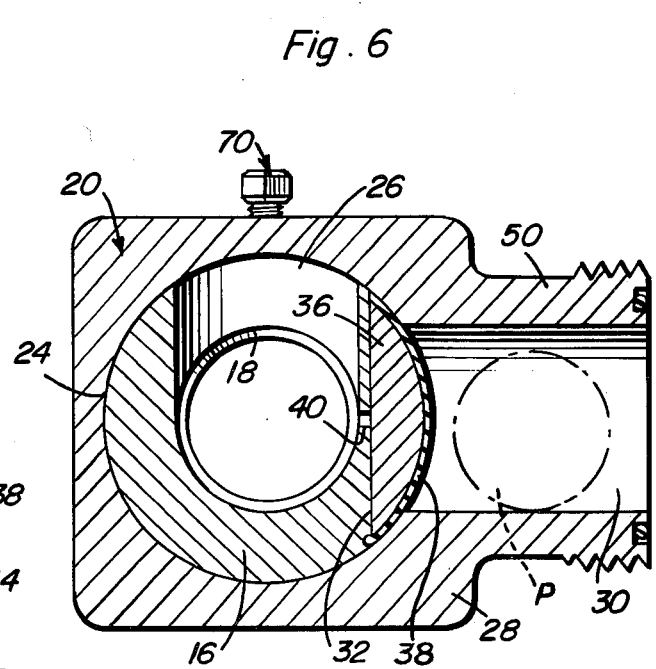
FIG. 6 is a sectional view similar to FIG. 5, with some parts removed, but showing the outer portion of the valve rotated 90° to the right from the orientation of the valve as seen in FIG. 5.
Figure 8:
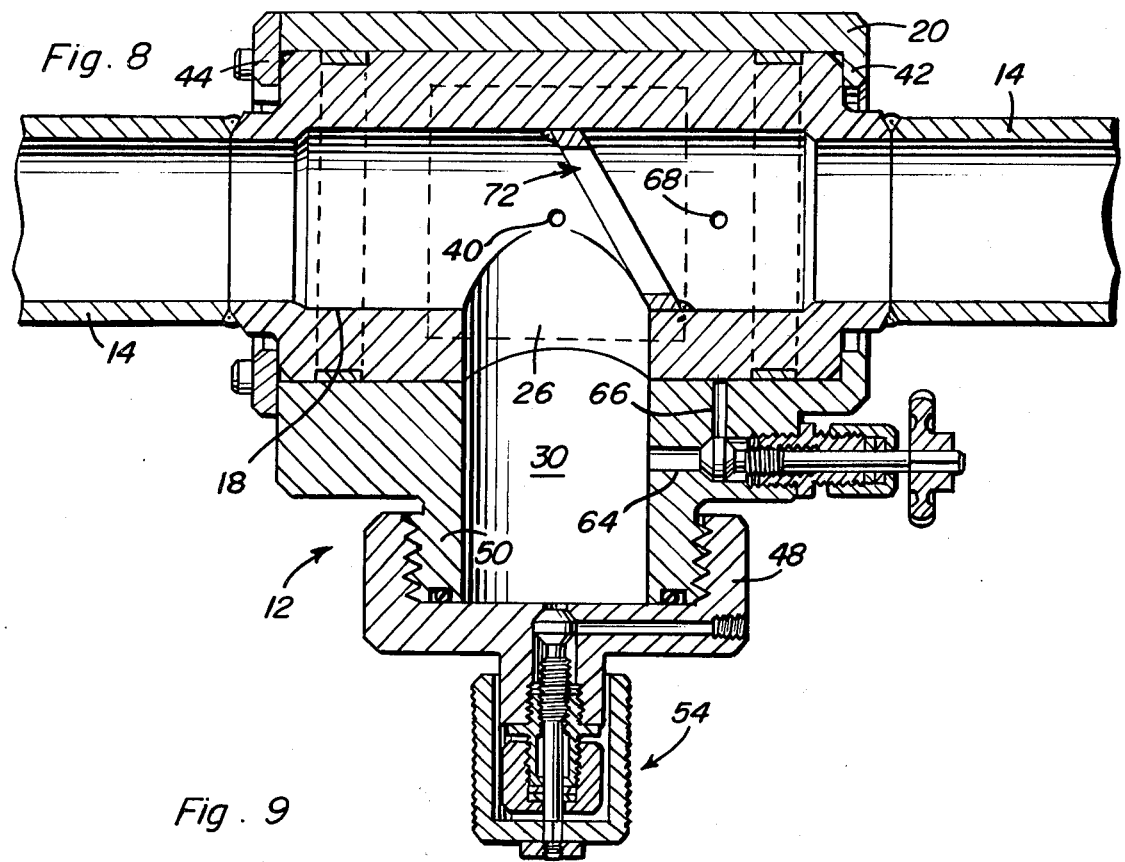
FIG. 8 is an enlarged, fragmentary, sectional view taken generally along the line 8—8 of FIG. 7.
Figure 9:
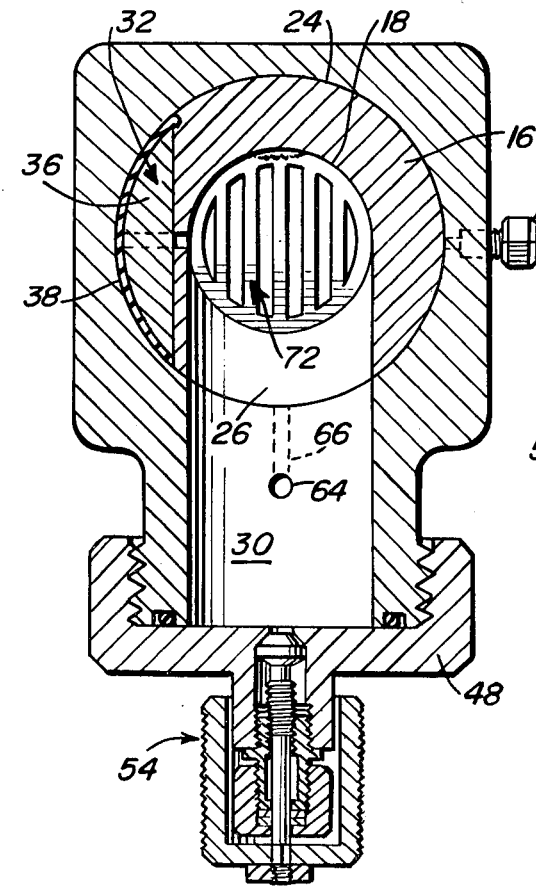
FIG. 9 is an enlarged, sectional view taken generally along the line 9—9 of FIG. 1.
Figure 10:
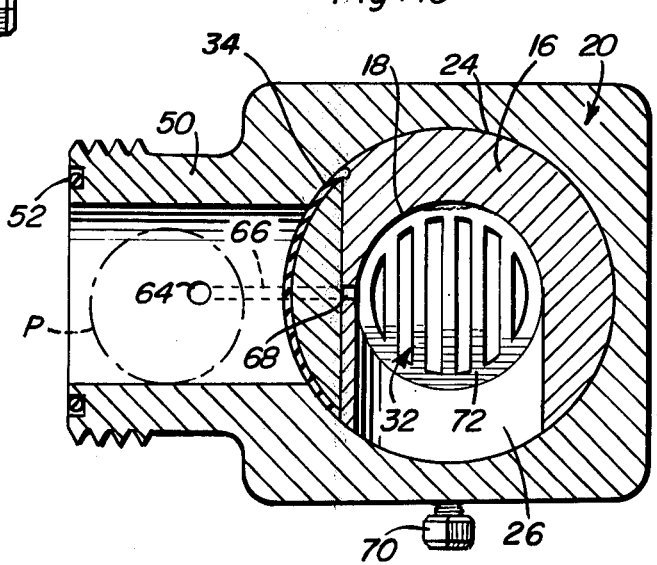
FIG. 10 is a sectional view similar to FIG. 9, with some parts removed, but showing the outer portion of the valve rotated 90° clockwise, or to the left, from the orientation of the valve as seen in FIG. 9.

Insertion arrangement 22 further includes a recess 32 provided in a portion of body 16 substantially 90° from opening 26, and an insert 34 is disposed in recess 32 for forming a seal for chamber 30 when sleeve 20 is rotated substantially 90° from the one axial position shown in FIGS. 4 and 5 to the load position shown in FIG. 6 wherein chamber 30 is disposed opposite insert 34. Insert 34 is constructed as a segment of a circle to form the block 36 from a metal such as steel or other suitable material, and is covered on its curved surface which mates with the inner surface of hole 24 of sleeve 20 with a layer 38 of a suitable resilient material such as natural or synthetic rubber. An aperture 40 extends through the portion of the side wall of body 16 which forms the back wall of recess 32 in order to assure communication between the bore or passage 18 and the back or planar wall of block 36. Such communication will assure that the resilient layer 38 is biased against the surface of hole 24 of sleeve 20.

As can best be seen from FIG. 4, sleeve 20 is retained on body 16 by an annular flange 42 at one end and by a clamp ring 44 secured as by suitable bolts to the other end of body 16. Further, there are a pair of ring seals 46 constructed from a suitable packing material and disposed in recesses provided about a circumference of body 16 so as to be disposed between the outer surface of body 16 and the surface of hole 24 of sleeve 20. By this arrangement, sleeve 20 is free to rotate about the outer surface of body 16 in a smooth yet fluid-tight manner.

The insertion arrangement 22 includes cap 48 removably mounted on a boss 50 forming part of enlarged portion 28 of sleeve 20 for covering chamber 30. An O-ring 52 is disposed in an annular groove provided in the top surface of boss 50 for providing a seal between cap 48 and boss 50, while mating internal and external screw threads are provided on cap 48 and boss 50 for providing a removable attachment of cap 48 to boss 50. Mounted centrally on cap 48 is a bleeder valve 54 arranged for bleeding pressure in chamber 30 to ambient before cap 48 can be removed from boss 50. More specifically, bleeder valve 54 is opened by rotation of the knurled knob provided as a part of valve 54 in order to place port 56, connected to a suitable container (not shown) at ambient pressure by a hose (not shown) attached to a fitting 58, in communication with ported valve seat 60. That is, the valve element of bleeder valve 54 is moved in a conventional manner by rotation of the knurled knob of valve 54 away from seat 60 in order to provide a fluid passage from the ported seat 60 through port 56 and out of cap 48.

Also included in the insertion arrangement 22 is an equalizer valve 62 mounted on enlarged portion 28 for placing a port 64 extending from chamber 30 in communication with a passage 66 terminating at a port 68 opening into passage 18 of body 16. Thus, when equalizer valve 62 is moved from the closed position shown in FIG. 4 to an open position in a conventional manner by turning the handle of valve 62, the pressure within chamber 30 will be equalized with that within passage 18.

Packing fittings 70 are advantageously provided on sleeve 20 so as to permit a suitable lubricant to be injected into the interface between body 16 and sleeve 20 and assure smooth rotational movement of sleeve 20 about body 16.

OPERATION OF THE LAUNCHER VALVE

Sleeve 20 is rotated to the position shown in FIG. 6 and bleeder valve 54 opened in order to place chamber 30 at ambient pressure. The pressure differential across insert 34 strengthens the seal between chamber 30 and passage 18. Once chamber 30 is at ambient pressure, cap 48 is removed and a suitable pig P placed within chamber 30. Cap 48 is then replaced, with the pressure within the insertion tube, or chamber 30, equalized with the line pressure within passage 18 by means of the by-pass or equalizer valve 62. Sleeve 20 may now be rotated until the chamber 30 is vertical and aligned with the opening 26 in the top of body 16. The pig P drops through opening 26 into passage 18 where the flow through pipeline 14 pushes the pig P forward in the particular direction of flow of the fluid.

DESCRIPTION OF THE RECEIVER VALVE

Referring now more particularly to FIGS. 7 through 10 of the drawings, it will be seen that the construction of receiver valve 12 is virtually identical to that of launcher valve 10, except that the receiver is oriented 180° from the orientation of launcher valve 10. Further, receiver valve 12 is provided with a deflector in the form of a grate 72 disposed in passage 18 provided in body 16 downstream of opening 26 provided in body 16 along the fluid flow path in pipeline 14 for diverting the pig P through the opening 26 and into the chamber 30. The opening 26 and chamber 30 are disposed beneath the body 16 so as to permit the force of gravity to facilitate the diversion or deflecting of pig P from passage 18 through opening 26 and into chamber 30.

OPERATION OF THE RECEIVER VALVE

When entering the receiver valve 12, the pig P encounters the bars of grate 72 and is decelerated toward a stop. But, the body cavity forming passage 18 is large enough to allow fluid flow to continue around the pig P. The bars of grate 74 are set at an angle which converts the forward force on pig P to a downward vertical force. This force, together with the weight of the pig P, moves the pig P through opening 26 in the bottom of body 16 and into the receiver tube section of sleeve 20 formed by the chamber 30, which in this instance is positioned extending vertically downward. When pig P is entered into the chamber 30, the sleeve 20 is rotated 90° to the unload position allowing the insert 34 to seal chamber 30. The pressure within chamber 30 is now bled as before by actuation of bleeder valve 54, the cap 48 removed, and the pig P taken from chamber 30.

SUMMARY

As can be appreciated from the above description and from the drawings, a pig valve according to the invention provides a simple yet efficient device employing a minimum of parts and no internal moving parts to achieve launching and receiving of a pipeline pig. This result is achieved by employing a sleeve which rotates about the outside of a valve body inserted into a pipeline with which the pigging system is associated, and permits the launching and receiving with possible obstruction to the fluid flow through the pipeline limited to that caused by the presence of the valve itself within the pipeline and pig valves.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pig valve for use with a pigging system of a pipeline, comprising, in combination:
   (a) a body providing a straight through passage and insertable into a pipeline, with the passage forming part of a fluid flow path through the pipeline;
   (b) a sleeve rotatably disposed surrounding the body; and
   (c) access means associated with the sleeve and body for permitting a pig to be transferred between the passage provided in the body and a point outside of the pipeline, the access means including an opening provided in the body, with the sleeve having an enlarged portion and the access means further including a chamber formed in the enlarged portion of the sleeve and disposed for communicating with the opening provided in the body in a one axial position of the sleeve relative to the body.

2. A pig valve for use with a pigging system of a pipeline, comprising, in combination:
   (a) a body providing a straight through passage and insertable into a pipeline, with the passage forming part of a fluid flow path through the pipeline;
   (b) a sleeve rotatably disposed surrounding the body; and
   (c) access means associated with the sleeve and body for permitting a pig to be transferred between the passage provided in the body and a point outside of the pipeline, the body being substantially a hollow cylinder in shape, with the sleeve having a through hole substantially circular in cross section and arranged matingly receiving the body for rotating coaxially of the cylindrical body, the access means including an opening provided in the body, with the sleeve having an enlarged portion and the access means further including a chamber formed in the enlarged portion of the sleeve and disposed for communicating with the opening provided in the body in a one axial position of the sleeve relative to the body.

3. A structure as defined in claim 2, wherein the access means further includes a recess provided in a portion of the body substantially 90 degrees from the opening provided in the body, and an insert disposed in the recess for forming a seal for the chamber when the sleeve is rotated substantially 90 degrees from the one axial position and the chamber provided in the enlarged portion of the sleeve is in a position opposite the insert.

4. A structure as defined in claim 3, wherein the insert is constructed as a segment of a circle and is covered on a curved surface thereof with a layer of a resilient material in order to assure a good seal between the insert and the body.

5. A structure as defined in claim 4, wherein the access means further includes a cap removably mounted on the enlarged portion of the sleeve for covering the chamber, and pressure bleeding and equalizing means provided on the sleeve for sequentially placing the chamber in communication with the ambient pressure when the chamber is opposite the insert, and placing the chamber in communication with the pressure in the body passage before rotating the sleeve and bringing the chamber into the one position opposite the opening provided in the body.

6. A structure as defined in claim 5, wherein the pressure bleeding and equalizing means includes a bleeder valve mounted in the cap for bleeding pressure in the chamber to ambient before the cap can be removed, and an equalizer valve in communication with the chamber and with the passage provided in the body for permitting selective equalization of the pressure in the chamber and passage when the sleeve is in the position wherein the chamber is opposite the insert.

7. A structure as defined in claim 6, wherein deflector means is disposed in the passage provided in the body downstream of the opening provided in the body in the direction along the fluid flow path through the pipeline for diverting the pig through the opening and into the chamber, the opening and chamber being disposed beneath the body for permitting the force of gravity to facilitate the diversion of the pig from the passage to the chamber.

8. A pig valve for use with a pigging system of a pipeline, comprising, in combination:
   (a) a body providing a straight through passage and insertable into a pipeline, with the passage forming part of a fluid flow path through the pipeline;
   (b) a sleeve rotatably disposed surrounding the body; and
   (c) access means including a chamber formed in the sleeve and body for permitting a pig to be transferred between the passage provided in the body and a point outside of the pipeline, the access means further including bleeding and equalizing means provided on the sleeve for sequentially placing the chamber in communication with ambient pressure and placing the chamber in communication with the pressure in the body passage at predetermined stages of launching and receiving a pig.

9. A structure as defined in claim 8, wherein the pressure bleeding and equalizing means includes a bleeder valve for bleeding pressure in the chamber to ambient, and an equalizer valve in communication with the chamber and the passage provided in the body for equalizing pressure in the chamber and passage.

10. A pig valve for use with a pigging system of a pipeline, comprising, in combination:
    (a) a body providing a straight through passage and insertable into a pipeline, with the passage forming part of a fluid flow path through the pipeline;
    (b) a sleeve rotatably disposed surrounding the body; and
    (c) access means associated with the sleeve and body for permitting a pig to be transferred between the passage provided in the body and a point outside of the pipeline, the access means including an opening provided in the body, with the sleeve having an enlarged portion and the access means further including a chamber formed in the enlarged portion of the sleeve and disposed communicating with the opening provided in the body in a one axial position of the sleeve relative to the body, and further including deflector means disposed in the passage provided in the body downstream of the opening provided in the body in the direction of fluid flow along the fluid flow path through the pipeline for diverting the pig through the opening and into the chamber, the opening and chamber being disposed beneath the body for permitting the force of gravity to facilitate in the diversion of the pig through the opening and into the chamber.

11. A method for transferring a pig between a pipeline and a point outside of the pipeline, comprising the steps of:
    (a) inserting a pig in a chamber disposed adjacent the pipeline; and
    (b) rotating the chamber about the longitudinal axis of the pipeline and permitting the pig to be removed from the chamber, the inserting step (a) including the step of rotating the chamber downwardly from a position communicating with a flow passage through the pipeline to a position sealed from the flow passage prior to the insertion of the pig, and the rotating step (b) including the step of bringing the chamber upwardly to the position communicating with the flow passage and permitting the pig to fall from the chamber into the flow passage.

12. A method as set forth in claim 11, wherein the inserting step (a) includes the step of diverting the pig into the chamber from a flow passage in the pipeline.

* * * * *